(12) United States Patent
Ozaki et al.

(10) Patent No.: US 10,190,433 B2
(45) Date of Patent: Jan. 29, 2019

(54) SHAFT SEALING MECHANISM

(71) Applicant: MITSUBISHI HITACHI POWER SYSTEMS, LTD., Kanagawa (JP)

(72) Inventors: Kohei Ozaki, Tokyo (JP); Azumi Yoshida, Tokyo (JP); Hidekazu Uehara, Tokyo (JP); Tanehiro Shinohara, Tokyo (JP); Hiroharu Oyama, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 15/536,369

(22) PCT Filed: Dec. 15, 2015

(86) PCT No.: PCT/JP2015/085000
§ 371 (c)(1),
(2) Date: Jun. 15, 2017

(87) PCT Pub. No.: WO2016/098752
PCT Pub. Date: Jun. 23, 2016

(65) Prior Publication Data
US 2017/0350267 A1 Dec. 7, 2017

(30) Foreign Application Priority Data
Dec. 16, 2014 (JP) .................. 2014-253684

(51) Int. Cl.
*F16J 15/44* (2006.01)
*F01D 11/02* (2006.01)
(Continued)

(52) U.S. Cl.
CPC .......... *F01D 11/025* (2013.01); *F01D 11/001* (2013.01); *F02C 7/28* (2013.01);
(Continued)

(58) Field of Classification Search
CPC ........ F02C 7/28; F04D 29/10; F05D 2240/55; F16J 15/22; F16J 15/24; F16J 15/328; F16J 15/3284; F16J 15/3288; F16J 15/3292
See application file for complete search history.

(56) References Cited

U.S. PATENT DOCUMENTS 6,976,680 B2 12/2005 Uehara et al.
7,364,165 B2 4/2008 Nakano et al.
(Continued)

FOREIGN PATENT DOCUMENTS

CN 1410691 4/2003
CN 1573023 2/2005
(Continued)

OTHER PUBLICATIONS

International Search Report dated Feb. 16, 2016 in International Application No. PCT/JP2015/085000.
(Continued)

*Primary Examiner* — Gilbert Y Lee
(74) *Attorney, Agent, or Firm* — Wenderoth, Lind & Ponack, L.L.P.

(57) ABSTRACT

A shaft sealing mechanism (11) that partitions an annular space (14) that is formed between a fixed part (12) and a rotating shaft (13) into a high-pressure-side region and a low-pressure-side region, that obstructs the flow of a fluid (G), and that is provided with: a plurality of annularly laminated thin-plate seal pieces (22) that are fixed to an annular seal housing (21) that is provided to the fixed part and are in sliding contact with the rotating shaft; and an annular low-pressure-side plate (26) that is sandwiched and held such that a low-pressure-side gap (δL) is formed between the seal housing and a low-pressure-side side edge part (22d) of the thin-plate seal pieces. The thin-plate seal pieces have a thick part (31) that is formed further to the
(Continued)

inside in the radial direction of the rotating shaft than an inner-circumferential-side tip part (26a) of the low-pressure-side plate.

4 Claims, 7 Drawing Sheets

(51) Int. Cl.
  *F16J 15/22* (2006.01)
  *F01D 11/00* (2006.01)
  *F16J 15/3284* (2016.01)
  *F02C 7/28* (2006.01)
  *F16J 15/3292* (2016.01)

(52) U.S. Cl.
  CPC ........... *F16J 15/22* (2013.01); *F16J 15/3284* (2013.01); *F16J 15/3292* (2013.01); *F05D 2240/57* (2013.01); *F05D 2240/59* (2013.01)

(56) References Cited

U.S. PATENT DOCUMENTS

| | | | |
|---|---|---|---|
| 8,413,992 | B2 | 4/2013 | Uehara et al. |
| 9,046,179 | B2 | 6/2015 | Uehara et al. |
| 9,273,782 | B2 | 3/2016 | Jahn et al. |
| 9,677,669 | B2 | 6/2017 | Uehara et al. |
| 2002/0105146 | A1* | 8/2002 | Uehara ................ F16J 15/3292 277/355 |
| 2007/0102886 | A1 | 5/2007 | Uehara et al. |
| 2008/0007008 | A1 | 1/2008 | Hoebel et al. |
| 2012/0007317 | A1 | 1/2012 | Beeck |
| 2012/0261884 | A1 | 10/2012 | Uehara et al. |
| 2013/0259680 | A1 | 10/2013 | Shinohara et al. |
| 2014/0070496 | A1 | 3/2014 | Jahn et al. |
| 2014/0138918 | A1 | 5/2014 | Luo et al. |

FOREIGN PATENT DOCUMENTS

| | | |
|---|---|---|
| CN | 102362107 | 2/2012 |
| JP | 2007-132432 | 5/2007 |
| JP | 2012-7668 | 1/2012 |
| JP | 2013-238311 | 11/2013 |
| JP | 2014-163420 | 9/2014 |
| KR | 10-2014-0052916 | 5/2014 |

OTHER PUBLICATIONS

International Preliminary Report on Patentability dated Jun. 20, 2017 in International Application No. PCT/JP2015/085000.
Office Action dated Mar. 14, 2018 in Korean Application No. 10-2017-7016112, with English Translation.
Extended European Search Report dated Nov. 24, 2017 in corresponding European patent application No. 15869957.9.

\* cited by examiner

SHAFT SEALING MECHANISM

TECHNICAL FIELD

The present invention relates to a shaft sealing mechanism disposed around a rotating shaft of a steam turbine or a gas turbine for reducing the amount of leakage of fluid leaked from a high-pressure side to a low-pressure side.

BACKGROUND ART

Conventionally, a shaft sealing mechanism for reducing the amount of leakage of fluid leaked from a high-pressure side to a low-pressure side is disposed around a rotating shaft of a steam turbine or a gas turbine, in order to reduce a loss of driving force. Such a shaft sealing mechanism has an annular seal structure in which multiple layers of thin-plate seal pieces in flat plate shapes with their width dimensions being in the rotating shaft direction are arranged in the circumferential direction of the rotating shaft. Outer-circumferential-side proximal ends of the thin-plate seal pieces are fixed to an annular seal housing while inner-circumferential-side distal ends of the thin-plate seal pieces are in sliding contact with the outer circumferential surface of the rotating shaft at a predetermined preload. This enables the shaft sealing mechanism to partition the surrounding space of the rotating shaft into a high-pressure-side region and a low-pressure-side region with the boundary formed by a large number of the thin-plate seal pieces arranged annularly on the outer side in the radial direction of the rotating shaft.

Hence, while the rotating shaft is not rotating, the inner-circumferential-side distal ends of the thin-plate seal pieces are in contact with the outer circumferential surface of the rotating shaft at the predetermined preload. On the other hand, while the rotating shaft is rotating, the thin-plate seal pieces are warped by pressure difference due to relative positional difference in pressure distribution between the upper and lower surfaces of the thin-plate seal pieces and by dynamic pressure effect of the fluid generated by the rotation of the rotating shaft, and accordingly, the inner-circumferential-side distal ends of the thin-plate seal pieces are floated up from the outer circumferential surface of the rotating shaft and brought into a noncontact state. This prevents abrasion and heat generation of the thin-plate seal pieces and the rotating shaft. Note that the surfaces of the thin-plate seal pieces facing the rotating shaft are referred to as the lower surfaces, and the surfaces thereof opposite from the lower surfaces are referred to as the upper surfaces.

Such a conventional shaft sealing mechanism has been disclosed, for example, in Patent Document 1.

PRIOR ART DOCUMENT

Patent Document

Patent Document 1: Japanese Patent Application Publication No. 2013-238311

SUMMARY OF THE INVENTION

Problems to be Solved by the Invention

In this structure, when the rotating shaft rotates, the fluid passes through between the thin-plate seal pieces and the pressure of the fluid is exerted on each thin-plate seal piece. However, as described above, since the inner-circumferential-side distal end of the thin-plate seal piece is a free end, vibration tends to occur on the distal end sides of the thin-plate seal pieces. In particular, of the distal end side portion of the thin-plate seal piece, at a portion on the low-pressure side where the fluid passes out between the thin-plate seal pieces toward the low-pressure-side region, the flow of the fluid causes vortex flows, which are likely to cause large vibration, and in some cases, may break thin-plate seal pieces.

Hence, the present invention is to solve the above problems and an object thereof is to provide a shaft sealing mechanism capable of reducing vibration of the thin-plate seal pieces while keeping the flexibility of the thin-plate seal pieces by partially thickening the thin-plate seal pieces.

Means for Solving the Problems

A shaft sealing mechanism to solve the above problems according to a first aspect of the invention is a shaft sealing mechanism that, by being disposed in an annular space formed between a fixed part and a rotating shaft, partitions the annular space into a high-pressure-side region and a low-pressure-side region to prevent fluid from flowing from the high-pressure-side region toward the low-pressure-side region in the annular space in a direction of the rotating shaft, characterized in that the shaft sealing mechanism comprises:

an annular seal housing disposed at an inner circumferential portion of the fixed part;

a plurality of thin-plate seal pieces stacked and disposed annularly in a circumferential direction of the rotating shaft, each of which has an outer-circumferential-side proximal end fixed to the seal housing, an inner-circumferential-side distal end being a free end and forming an acute angle with an outer circumferential surface of the rotating shaft, and a width dimension in the direction of the rotating shaft; and an annular low-pressure-side plate held between the seal housing and low-pressure-side side edges of the thin-plate seal pieces facing the low-pressure-side region so as to form a gap between the low-pressure-side side edges and the seal housing in the direction of the rotating shaft, wherein each of the thin-plate seal pieces has a thick part which is formed inward of an inner-circumferential-side distal end of the low-pressure-side plate in a radial direction of the rotating shaft, and has a largest thickness in the thin-plate seal piece.

A shaft sealing mechanism to solve the above problems according to a second aspect of the invention is characterized in that the thick part is formed along the low-pressure-side side edge.

A shaft sealing mechanism to solve the above problems according to a third aspect of the invention is characterized in that the thick part is formed intermittently in the radial direction of the rotating shaft.

A shaft sealing mechanism to solve the above problems according to a fourth aspect of the invention is characterized in that the thick part is formed on an upper surface and a lower surface of the thin-plate seal piece alternately.

A shaft sealing mechanism to solve the above problems according to a fifth aspect of the invention is characterized in that the thick part is formed to include a low-pressure-side distal end corner formed by the inner-circumferential-side distal end and the low-pressure-side side edge of the thin-plate seal piece.

Effect of the Invention

Hence, according to the shaft sealing mechanism of the present invention, it is possible to improve only the stiffness of the thin-plate seal piece on the distal end side which is an area where vibration occurs, without changing the stiffness of the thin-plate seal piece on the proximal end side, by forming a thick part only on the distal end side of the thin-plate seal piece to partially thicken the thin-plate seal piece. This makes it possible to reduce vibration of the thin-plate seal piece while keeping the flexibility of the thin-plate seal piece.

MODE FOR CARRYING OUT THE INVENTION

A shaft sealing mechanism according to the present invention will be described in detail using the drawings.

Embodiment

Figure 1:
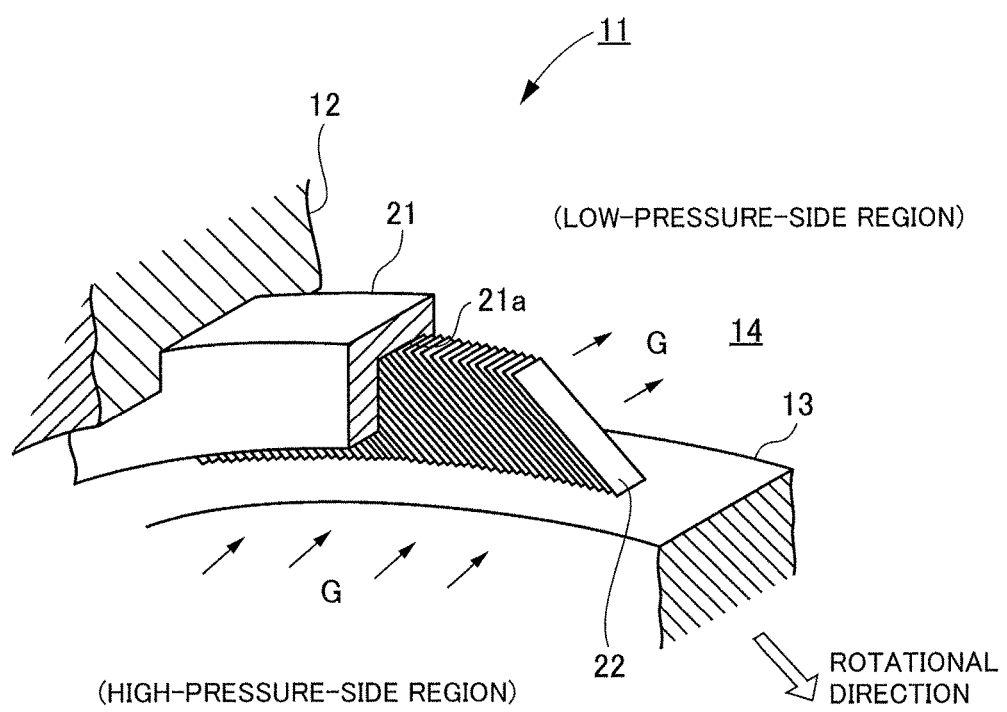
FIG. 1 is a schematic configuration diagram of a shaft sealing mechanism according to the present invention.

As illustrated in FIG. 1, a shaft sealing mechanism 11 according to the present invention is applied to, for example, a steam turbine or a gas turbine and is disposed in an annular space 14 formed between a rotating shaft 13 and a fixed part (stationary part) 12 such as a casing or stator vanes.

Figure 2:
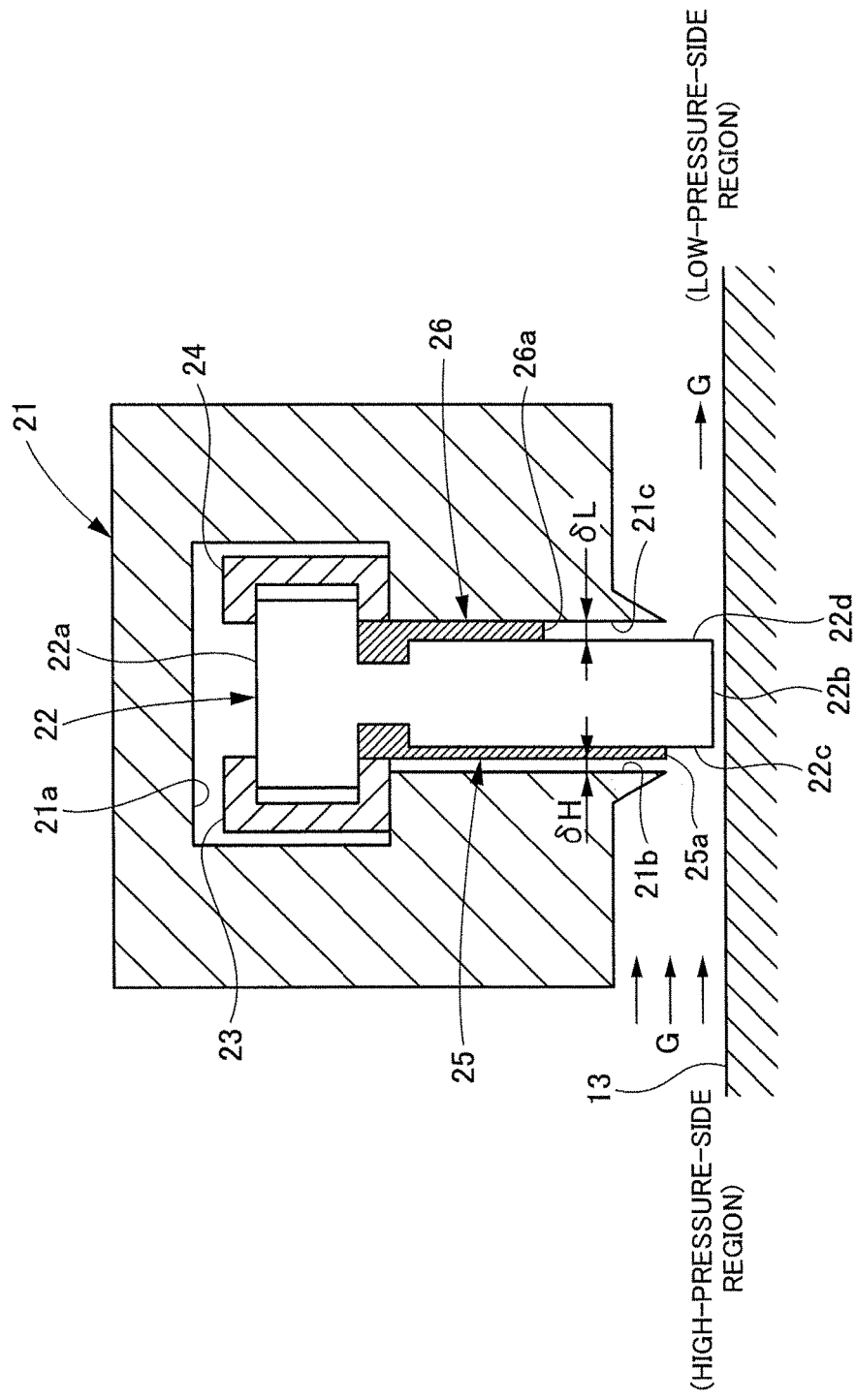
FIG. 2 is an axial cross-sectional view of the shaft sealing mechanism according to the present invention.

Specifically, as illustrated in FIGS. 1 and 2, on an inner circumferential portion of the fixed part 12, a seal housing 21, which is an outer shell of the shaft sealing mechanism 11, is disposed annularly along the circumferential direction of the rotating shaft 13. In addition, formed in an inner circumferential portion of the seal housing 21 is an annular groove 21a, inside of which a large number of thin-plate seal pieces 22 are arranged along the circumferential direction of the rotating shaft 13.

The outer-circumferential-side proximal ends 22a of the thin-plate seal pieces 22 are fixed to the inside of the annular groove 21a while the inner-circumferential-side distal ends 22b of the thin-plate seal pieces 22 are in sliding contact with the outer circumferential surface of the rotating shaft 13 at a predetermined preload. Here, the thin-plate seal pieces 22 are arranged such that the inner-circumferential-side distal ends 22b, which are free ends, have inclination in the rotational direction with respect to the outer circumferential surface of the rotating shaft 13 and form acute angles with the outer circumferential surface. Note that in the thin-plate seal pieces 22 supported in an inclined manner, the surfaces facing the rotating shaft 13 are referred to as the lower surfaces, and the upper surfaces opposite from the lower surfaces are referred to as the upper surfaces.

In the annular space 14 formed between the fixed part 12 and the rotating shaft 13, fluid G, such as steam or combustion gas, flows from a high-pressure side to a low-pressure side in the axial direction of the rotating shaft 13. For this, the shaft sealing mechanism 11 has an annular seal structure in which multiple layers of the thin-plate seal pieces 22 are arranged in the circumferential direction of the rotating shaft 13, and in which the boundary formed by a large number of the thin-plate seal pieces 22 arranged annularly partitions the annular space 14 into a high-pressure-side region being an upstream side in the fluid flowing direction and a low-pressure-side region being an downstream side in the fluid flowing direction. This structure reduces the amount of leakage of the fluid G leaked from the high-pressure-side region to the low-pressure-side region.

Figure 3:
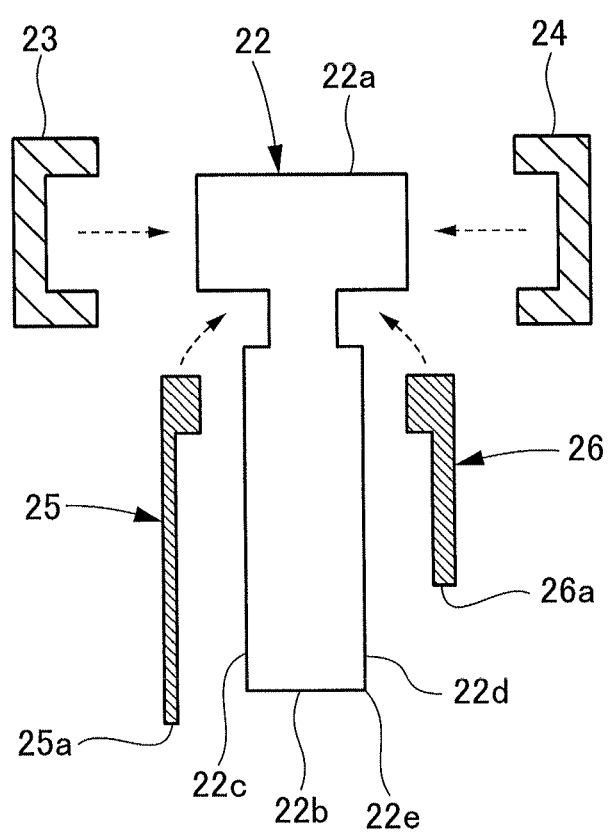
FIG. 3 is an exploded view of a support structure of a thin-plate seal piece.

Here, as illustrated in FIGS. 2 and 3, each of the thin-plate seal pieces 22 is formed from a flexible material having flexibility and has a flat plate shape with its width dimension being in the axial direction of the rotating shaft 13. Specifically, the thin-plate seal piece 22 has a T shape in which the plate width on the proximal end side (the outer-circumferential-side proximal end 22a) is wider than the plate width on the distal end side (the inner-circumferential-side distal end 22b) and is thinned so as to exhibit flexibility. The thin-plate seal pieces 22 are arranged annularly with minute gaps of a certain length therebetween in the circumferential direction of the rotating shaft 13.

The proximal end sides of the thin-plate seal pieces 22 are held between a pair of right and left retainers 23, 24 for keeping the annular arrangement of the thin-plate seal pieces 22, so as to be enclosed from both sides in the plate width direction. The retainers 23, 24 are fitted into the annular groove 21a of the seal housing 21.

In addition, on the high-pressure side and the low-pressure side of the thin-plate seal pieces 22, a high-pressure-side plate 25 and a low-pressure-side plate 26 are disposed respectively to function as guide plates for the fluid G.

Specifically, the high-pressure-side plate 25 having an annular shape is disposed on the left sides (the side positioned on the left in FIGS. 2 and 3 on the paper) of the thin-plate seal pieces 22, which face the high-pressure-side region. This high-pressure-side plate 25 is disposed adjacent to high-pressure-side side edges 22c of the thin-plate seal pieces 22 facing the high-pressure-side region and is held between the high-pressure-side side edges 22c and the retainer 23.

Here, an inner-circumferential-side distal end 25a of the high-pressure-side plate 25 extends to an opening edge of the annular groove 21a, but does not reach the inner-circumferential-side distal end 22b of the thin-plate seal pieces 22. Moreover, between a high-pressure-side side surface 21b, facing the high-pressure-side region, of the annular groove 21a and the high-pressure-side plate 25, a high-pressure-side gap δH of a certain length is formed in the axial direction of the rotating shaft 13 (the fluid flowing direction, the plate width direction of the seal pieces).

By providing the high-pressure-side plate 25 in this way, the inner-circumferential-side distal ends 22b of the thin-plate seal pieces 22 are positioned inward of the innercircumferential-side distal end 25a of the high-pressure-side plate 25 in the radial direction of the rotating shaft 13. Accordingly, the fluid G flowing in from the high-pressure-side region flows into the distal end sides of the thin-plate seal pieces 22.

Meanwhile, the low-pressure-side plate 26 annularly is disposed on the right sides (the side positioned on the right in FIGS. 2 and 3 on the paper) of the thin-plate seal pieces 22, which face the low-pressure-side region. This low-pressure-side plate 26 is disposed adjacent to low-pressure-side side edges 22d, facing the low-pressure-side region, of the thin-plate seal pieces 22 and is held among the low-pressure-side side edges 22d, the retainer 24, and a low-pressure-side side surface 21c, facing the low-pressure-side region, of the annular groove 21a.

Here, an inner-circumferential-side distal end 26a of the low-pressure-side plate 26 does not reach an opening edge of the annular groove 21a or the inner-circumferential-side distal ends 22b of the thin-plate seal pieces 22 and is positioned on the outer side of the inner-circumferential-side distal end 25a of the high-pressure-side plate 25 in the radial direction of the rotating shaft 13. In other words, the low-pressure-side plate 26 is shorter than the high-pressure-side plate 25. Moreover, between the low-pressure-side side surface 21c of the annular groove 21a and the low-pressure-side side edges 22d, a low-pressure-side gap δL of a certain length is formed in the axial direction of the rotating shaft 13.

The low-pressure-side plate 26 provided in this way allows the low-pressure-side gap 5L to be formed between the low-pressure-side side surface 21c and the low-pressure-side side edges 22d. The low-pressure-side gap 5L is formed by the thickness of the low-pressure-side plate 26, and the gap length of the low-pressure-side gap δL can thus be set by adjusting the thickness of the low-pressure-side plate 26.

In addition, the pressure distribution of the fluid G on the upper and lower surfaces of the thin-plate seal pieces 22 can be set in accordance with the gap lengths of the high-pressure-side gap δH and the low-pressure-side gap δL. Moreover, in accordance with the quantitative relationship between the gap length of the high-pressure-side gap δH and the gap length of the low-pressure-side gap δL, it is possible to set the magnitude of the pressure difference (floating force) due to relative positional difference in the pressure distribution between the upper and lower surfaces of the thin-plate seal pieces 22.

Note that in the shaft sealing mechanism 11 according to the present invention, the radial gap length between the inner-circumferential-side distal end 26a of the low-pressure-side plate 26 and the outer circumferential surface of the rotating shaft 13 is designed to be greater than the radial gap length between the inner-circumferential-side distal end 25a of the high-pressure-side plate 25 and the outer circumferential surface of the rotating shaft 13, in order to yield stable floating force.

With this structure, while the rotating shaft 13 is not rotating, the inner-circumferential-side distal ends 22b of the thin-plate seal pieces 22 are in contact with the outer circumferential surface of the rotating shaft 13 at the predetermined preload. On the other hand, while the rotating shaft 13 is rotating, the floating force is exerted on the thin-plate seal pieces 22 by the pressure difference due to the relative positional difference in the pressure distribution between the upper and lower surfaces of the thin-plate seal pieces 22 and by the dynamic pressure effect of the fluid G generated by the rotation of the rotating shaft 13. This makes the thin-plate seal pieces 22 warped, and accordingly, the inner-circumferential-side distal ends 22b thereof are floated from the outer circumferential surface of the rotating shaft 13 and brought into a noncontact state, which prevents abrasion and heat generation of the rotating shaft 13 and the thin-plate seal pieces 22. At the same time, the thin-plate seal pieces 22 brought in noncontact with the rotating shaft 13 reduce the amount of leakage of the fluid G flowing from the high-pressure-side region toward the low-pressure-side region.

Figure 4A:
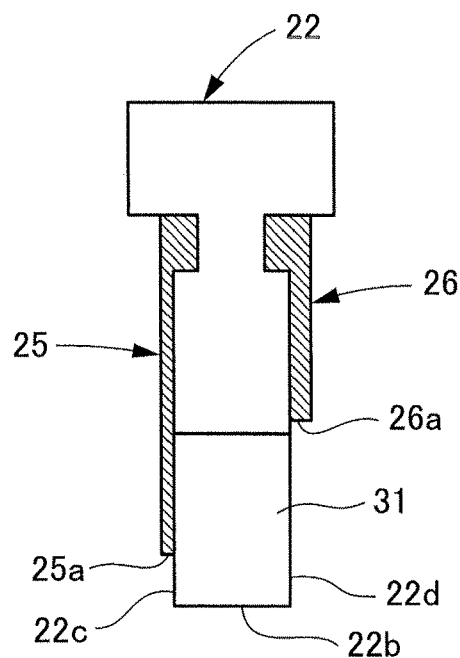
FIGS. 4A and 4B are detailed views of a shaft sealing mechanism according to a first embodiment, 4A is a front view of a thin-plate seal piece, and 4B is a side view of the thin-plate seal piece on a low-pressure side.
Figure 4B:
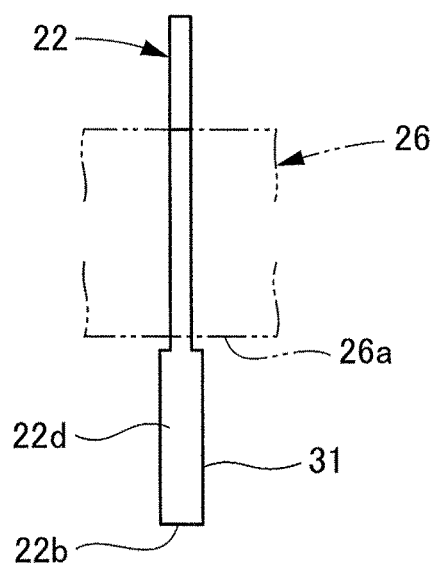

Here, as illustrated in FIGS. 4A and 4B, a thick part 31 is formed on the thin-plate seal piece 22. This thick part 31 is arranged inward of the inner-circumferential-side distal end 26a of the low-pressure-side plate 26 in the radial direction of the rotating shaft 13. The thick part 31 has a uniform thickness, which is largest in the thin-plate seal piece 22. In other words, in the thin-plate seal piece 22, the thickness of the thick part 31 is made larger than that of any other part.

Thus, by forming a thick part 31 only on the distal end side of the thin-plate seal piece 22 to partially thicken the thin-plate seal piece 22, it is possible to improve only the stiffness of the thin-plate seal piece 22 on the distal end side which is an area where vibration occurs, without changing the stiffness of the thin-plate seal piece 22 on the proximal end side. This makes it possible to reduce the vibration of the thin-plate seal piece 22 while keeping the flexibility of the thin-plate seal piece 22.

In addition, even though the thick part 31 is formed on the thin-plate seal piece 22, since the protruding lengths of the thick part 31 on the upper surface and the lower surface of the thin-plate seal piece 22 are equal to each other, the process of the thin-plate seal piece 22 is easy. Moreover, even though the thick part 31 is formed, since the protruding lengths from the upper surface and the lower surface are the same, there is no possibility of adversely affecting the weight balance of the thin-plate seal piece 22. Hence, even when the thin-plate seal pieces 22 are supported in the inclined manner and assembled annularly, it is possible to assemble the thin-plate seal pieces 22 with high precision while properly keeping the minute gaps between the adjacent thin-plate seal pieces 22.

Figure 6A:
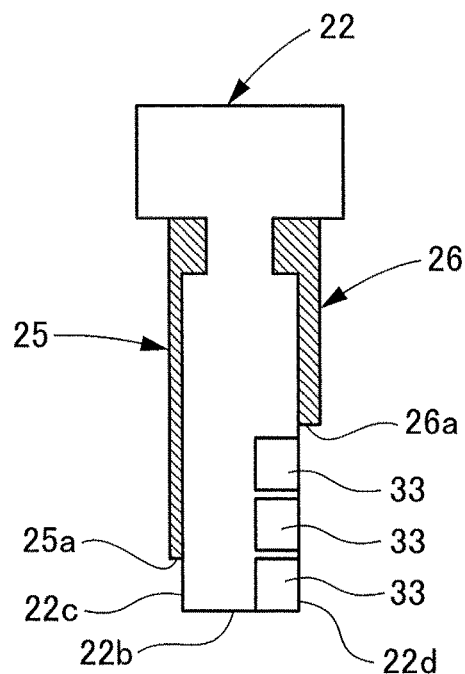
FIGS. 6A to 6C are detailed views of a shaft sealing mechanism according to a third embodiment, 6A is a front view of a thin-plate seal piece, 6B is a side view of the thin-plate seal piece on the low-pressure side, and 6C is a side view of a thin-plate seal piece on the low-pressure side in an example different from the FIG. 6B.
Figure 6B:
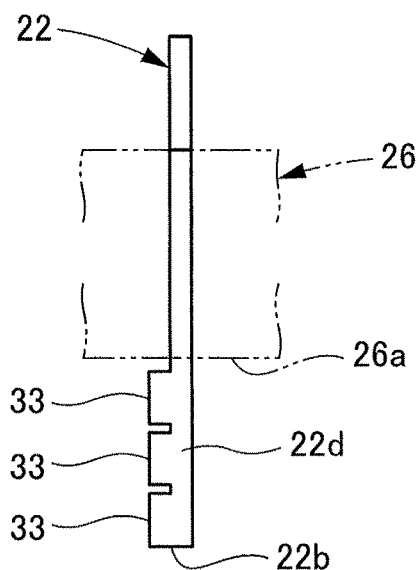
Figure 6C:
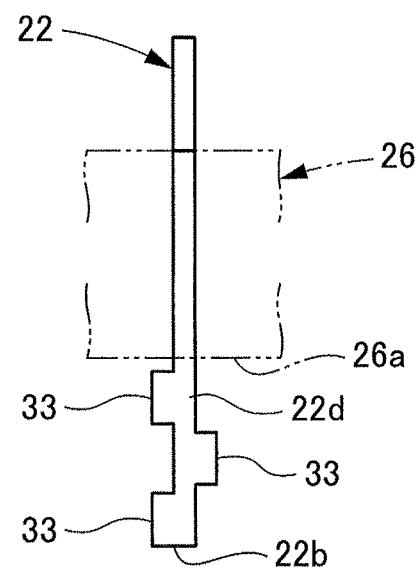
Figure 7:
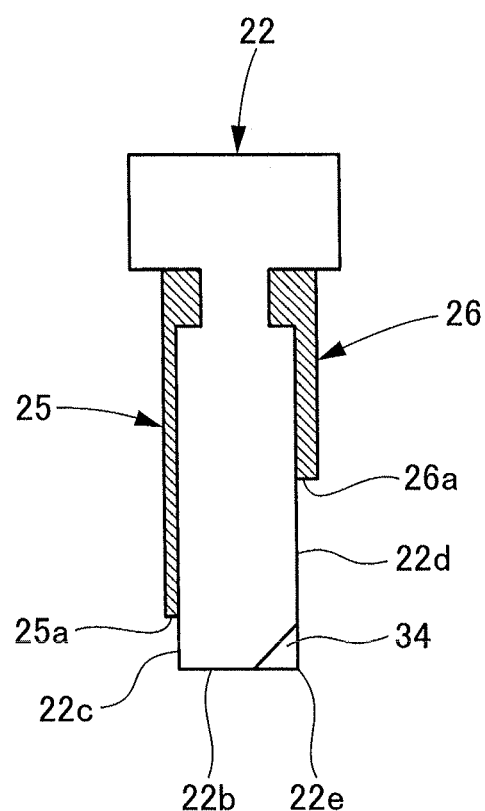
FIG. 7 is a detailed view of a shaft sealing mechanism according to a fourth embodiment, illustrating a front view of a thin-plate seal piece.

Note that although in the above embodiment, the thick part is formed on the entire part inward of the inner-circumferential-side distal end 26a of the low-pressure-side plate 26 in the radial direction of the rotating shaft 13, one or more thick parts may be more partially (locally) formed as illustrated in FIGS. 5 to 7.

Figure 5A:
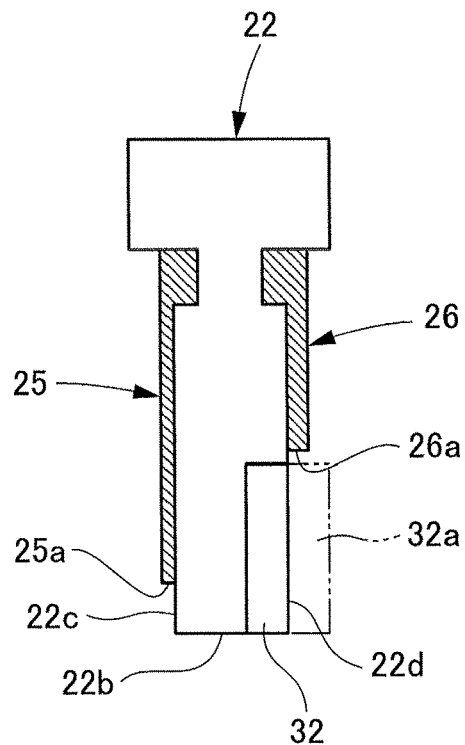
FIGS. 5A and 5B are detailed views of a shaft sealing mechanism according to a second embodiment, 5A is a front view of a thin-plate seal piece, and 5B is a side view of the thin-plate seal piece on the low-pressure side.
Figure 5B:
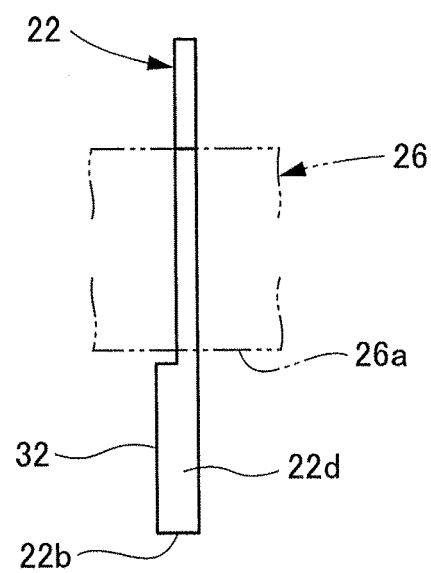

Hence, as illustrated in FIGS. 5A and 5B, a thick part 32 is formed in the thin-plate seal piece 22. The thick part 32 is arranged inward of the inner-circumferential-side distal end 26a of the low-pressure-side plate 26 in the radial direction of the rotating shaft 13 and along the inner-circumferential-side distal end 22b and the low-pressure-side side edge 22d. The thick part 32 has a uniform thickness, which is largest in the thin-plate seal piece 22. In other words, in the thin-plate seal piece 22, the thickness of the thick part 32 is made larger than that of any other part.

When the thick part 32 as above is formed, for example, an extra part 32a corresponding to the thick part 32 may be formed in advance along the low-pressure-side side edge 22d of the thin-plate seal piece 22 before making the thickness large, and the thick part 32 may be formed by folding back the extra part 32a. This makes it possible to form the thick part 32 accurately and easily.

Thus, by forming the thick part 32 only on the distal end side and the low-pressure side of the thin-plate seal piece 22 to partially thicken the thin-plate seal piece 22, it is possible to improve only the stiffness of the thin-plate seal piece 22 on the distal end side, which is an area where vibration occurs, and the low-pressure side, without changing the stiffness of the thin-plate seal piece 22 on the proximal end side. This makes it possible to reduce the vibration of the thin-plate seal piece 22 while keeping the flexibility of the thin-plate seal piece 22. In addition, when the thick part 32 is formed in the thin-plate seal piece 22, it is possible to improve the overall flexibility, compared to the case where the thick part 31 is formed in the thin-plate seal piece 22.

Further, as illustrated in FIGS. 6A and 6B, multiple thick parts 33 are formed in the thin-plate seal piece 22. These thick parts 33 are not only arranged inward of the inner-circumferential-side distal end 26a of the low-pressure-side plate 26 in the radial direction of the rotating shaft 13, but arranged intermittently in the radial direction of the rotating shaft 13 along the low-pressure-side side edge 22d. The thick parts 33 have a uniform thickness, which is largest in the thin-plate seal piece 22. In other words, in the thin-plate seal piece 22, the thickness of the thick parts 33 is made larger than that of any other part.

In addition, when the thick parts 33 are formed, the thick parts 33 may be formed not only on the lower surface of the thin-plate seal piece 22 as illustrated in FIGS. 6A and 6B, but the thick parts 33 may be formed on the upper surface and the lower surface of the thin-plate seal piece 22 alternately as illustrated in FIG. 6C.

Thus, by forming the thick parts 33 intermittently only on the distal end side and the low-pressure side of the thin-plate seal piece 22 to partially thicken the thin-plate seal piece 22, it is possible to improve only the stiffness of the thin-plate seal piece 22 on the distal end side, which is an area where vibration occurs, and the low-pressure side, without changing the stiffness of the thin-plate seal piece 22 on the proximal end side. This makes it possible to reduce the vibration of the thin-plate seal piece 22 while keeping the flexibility of the thin-plate seal piece 22.

Furthermore, as illustrated in FIG. 7, a thick part 34 is formed in the thin-plate seal piece 22. This thick part 34 is arranged to stretch over a low-pressure-side distal end corner 22e formed by the inner-circumferential-side distal end 22b and the low-pressure-side side edge 22d. The thick part 34 has a uniform thickness, which is largest in the thin-plate seal piece 22. In other words, in the thin-plate seal piece 22, the thickness of the thick part 34 is made larger than that of any other part.

Thus, by forming the thick part 34 only at the low-pressure-side distal end corner 22e of the thin-plate seal piece 22 to partially thicken the thin-plate seal piece 22, it is possible to improve only the stiffness at the low-pressure-side distal end corner 22e where the vibration in the thin-plate seal piece 22 is strongest, without changing the stiffness of the thin-plate seal piece 22 on the proximal end side. This makes it possible to reduce the vibration of the thin-plate seal piece 22 while keeping the flexibility of the thin-plate seal piece 22. In addition, since the thick part 34 is formed only at the low-pressure-side distal end corner 22e of the thin-plate seal piece 22, even though the stiffness is improved by forming the thick part 34 as above, influence on the floating force exerted on the thin-plate seal piece 22 can be minimized.

INDUSTRIAL APPLICABILITY

The shaft sealing mechanism according to the present invention can increase the life of the seal by using the partially reinforced thin-plate seal pieces, and can thus be utilized significantly advantageously in continuous operation of a turbine.

EXPLANATION OF REFERENCE NUMERALS 11 shaft sealing mechanism
12 fixed part
13 rotating shaft
14 annular space
21 seal housing
21a annular groove
21b high-pressure-side side surface
21c low-pressure-side side surface
22 thin-plate seal piece
22a outer-circumferential-side proximal end
22b inner-circumferential-side proximal end
22c high-pressure-side side edge
22d low-pressure-side side edge
22e low-pressure-side distal end corner
23, 24 retainer
25 high-pressure-side plate
25a inner-circumferential-side distal end
26 low-pressure-side plate
26a inner-circumferential-side distal end
31 to 34 thick part
G fluid
δH high-pressure-side gap
δL low-pressure-side gap

The invention claimed is:

1. A shaft sealing mechanism that, by being disposed in an annular space formed between a fixed part and a rotating shaft, partitions the annular space into a high-pressure-side region and a low-pressure-side region to prevent fluid from flowing from the high-pressure-side region toward the low-pressure-side region in the annular space in a direction of the rotating shaft, characterized in that the shaft sealing mechanism comprises:

an annular seal housing disposed at an inner circumferential portion of the fixed part;

a plurality of thin-plate seal pieces stacked and disposed annularly in a circumferential direction of the rotating shaft, each of which has an outer-circumferential-side proximal end fixed to the seal housing, an inner-circumferential-side distal end being a free end and forming an acute angle with an outer circumferential surface of the rotating shaft, and a width dimension in the direction of the rotating shaft;

an annular high-pressure-side plate disposed between high-pressure-side side edges of the thin-plate seal pieces facing the high-pressure-side region and the seal housing so as to form a gap between the high-pressure-side plate and the seal housing in the direction of the rotating shaft, an inner-circumferential-side distal end of the high-pressure-side plate being positioned outward of the inner-circumferential-side distal ends of the thin-plate seal pieces in the radial direction of the rotating shaft; and an annular low-pressure-side plate held between the seal housing and low-pressure-side side edges of the thin-plate seal pieces facing the low-pressure-side region so as to form a gap between the low-pressure-side side edges and the seal housing in the direction of the rotating shaft, an inner-circumferential-side distal end of the low-pressure-side plate being positioned outward of the inner-circumferential-side distal end of the high-pressure-side plate in the radial direction of the rotating shaft, wherein each of the thin-plate seal pieces has a thick part circumferential-side distal end of the low-pressure-side plate in the radial direction of the rotating shaft and also outward of the inner-circumferential-side distal end of the high-pressure-side plate in the radial direction of the rotating shaft.

2. The shaft sealing mechanism according to claim 1, characterized in that the thick part is formed intermittently in the radial direction of the rotating shaft.

3. The shaft sealing mechanism according to claim 1, characterized in that the thick part is formed to include a low-pressure-side distal end corner formed by the inner-circumferential-side distal end and the low-pressure-side side edge of the thin-plate seal piece.

4. A shaft sealing mechanism that, by being disposed in an annular space formed between a fixed part and a rotating shaft, partitions the annular space into a high-pressure-side region and a low-pressure-side region to prevent fluid from flowing from the high-pressure-side region toward the low-pressure-side region in the annular space in a direction of the rotating shaft, characterized in that the shaft sealing mechanism comprises:

an annular seal housing disposed at an inner circumferential portion of the fixed part;

a plurality of thin-plate seal pieces stacked and disposed annularly in a circumferential direction of the rotating shaft, each of which has an outer-circumferential-side proximal end fixed to the seal housing, an inner-circumferential-side distal end being a free end and forming an acute angle with an outer circumferential surface of the rotating shaft, and a width dimension in the direction of the rotating shaft; and an annular low-pressure-side plate held between the seal housing and low-pressure-side side edges of the thin-plate seal pieces facing the low-pressure-side region so as to form a gap between the low-pressure-side side edges and the seal housing in the direction of the rotating shaft, wherein each of the thin-plate seal pieces has a thick part which is formed inward of an inner-circumferential-side distal end of the low-pressure-side plate in a radial direction of the rotating shaft and along the low-pressure-side side edge, and has a largest thickness in the thin-plate seal piece, and the thick part is formed intermittently in the radial direction of the rotating shaft, and on an upper surface and a lower surface of the thin-plate seal piece alternately.

* * * * *